United States Patent [19]
Bell

[11] Patent Number: 4,928,774
[45] Date of Patent: May 29, 1990

[54] CULTIVATOR WITH IMPROVED DISC POSITIONING MEANS

[75] Inventor: Dennis E. Bell, Brazil, Ind.
[73] Assignee: Landoll Corporation, Marysville, Kans.
[21] Appl. No.: 81,331
[22] Filed: Aug. 4, 1987
[51] Int. Cl.$^5$ .......... A01B 21/08; A01B 71/02
[52] U.S. Cl. .......... 172/430; 172/574; 172/603; 172/742; 172/744
[58] Field of Search .......... 172/166, 165, 603, 139, 172/140, 141, 574, 602, 741, 742, 744, 762; 403/59, 61, 108

[56] References Cited

U.S. PATENT DOCUMENTS

| | | | |
|---|---|---|---|
| 556,356 | 3/1896 | Lindstrand | 172/603 |
| 796,942 | 8/1905 | Stafford | 172/603 X |
| 1,500,367 | 7/1924 | Caughey | 172/574 |
| 2,430,434 | 11/1947 | Rutter | 172/763 |
| 2,577,952 | 12/1951 | Davis | 172/459 |
| 2,676,527 | 4/1954 | Reustle | 172/742 X |
| 2,790,367 | 4/1957 | Simmons | 172/742 X |
| 2,829,577 | 4/1958 | Williams | 172/383 |
| 2,973,819 | 3/1961 | Simmons | 172/603 X |
| 3,244,237 | 4/1966 | Keplinger et al. | 172/603 |
| 4,009,759 | 3/1977 | Ernst | 172/395 |
| 4,295,532 | 10/1981 | Williams et al. | 172/184 |
| 4,550,122 | 10/1985 | David et al. | 172/158 |
| 4,607,705 | 8/1986 | Tebben | 172/574 X |
| 4,650,005 | 3/1987 | Tebben | 172/603 X |
| 4,738,316 | 4/1988 | Wood | 172/603 |
| 4,815,544 | 3/1989 | Good | 172/430 |

Primary Examiner—Richard J. Johnson
Assistant Examiner—Jeffery L. Thompson
Attorney, Agent, or Firm—H. John Barnett

[57] ABSTRACT

An adjustment means for a cultivator disc which provides lateral, vertical and angular adjustment means. A plurality of discs are mounted in parallel on a gang frame, and may be individually adjusted in the field to exact, predetermined positions established by a positive positioning means, and then firmly held in place by a clamping means. In the presently preferred embodiment, the individual support shafts of each cultivator disc are supported by the angle adjustment brackets, which are supported by the lateral adjustment brackets, which are slidably supported in predetermined fixed positions in lateral housings attached to the main towing bar of the cultivator assembly.

11 Claims, 1 Drawing Sheet

CULTIVATOR WITH IMPROVED DISC POSITIONING MEANS

BACKGROUND OF THE INVENTION

1. Field of the Invention

This invention pertains to a farm implement, more particularly to a cultivator apparatus which is well adapted to low tillage cultivation of growing crops to minimize weeds. The invention provides a novel field adjustment system to position the cultivator discs for optimum effectiveness.

2. Description of the Related Art

A number of prior patents show a variety of systems for adjusting the position of the individual discs in a planter or cultivator, but none of those show a simple, positive locking and positioning system. For example, Lindstrand U.S. Pat. No. 556,356 shows complementary segmented slots for angular positioning of pivotally mounted standards to a specific angle. Similar angular positioning means is shown for the cultivator discs. The Lindstrand system provides only angular adjustments using a complicated system which requires extensive manufacturing steps, and which could be damaged or broken under typical field conditions.

Rutter U.S. Pat. No. 2,430,434 discloses a U-bolt clamping assembly which requires loosening four nuts to adjust. The radial adjustment has no positive positioning means, and a positioning cam is required to hold the standard in place, making this a complex system which requires loosening four bolts every time an adjustment is desired. The cam does not prevent the standard from slipping away from the cam's face during rough field use.

The disc plow shown in Davis U.S. Pat. No. 2,577,952 shows complementary hubs having intermeshing teeth for making angular adjustment of a disc plow standard. The system appears to be complex and expensive. Davis does not appear to have any means for lateral adjustment of his plow discs.

Williams U.S. Pat. No. 2,829,577 describes a disc plow having a complex adjustment system including a U-bolt clamping means for horizontal adjustment and an angular adjustment plate including a pivot bolt and U-shaped bracket.

Keplinger et al U.S. Pat. No. 3,244,237 describes both vertical and angular adjustment, but no positive position locking means. Instead, the tightening bolt extends through a slot and may be subject to slippage in rough field use conditions.

An independently adjustable disc member is shown in Ernst U.S. Pat. No. 4,009,759, which employs set bolts which are prone to slipping under rugged field conditions. There is no solid locking feature in this patent.

Williams et al U.S. Pat. No. 4,295,532 and David et al U.S. Pat. No. 4,550,122 both show complex adjustment means for trash clearing discs specifically intended for low tillage cultivation. Williams et al adjusts for angle, only, but not for height. David et al only adjusts for height, and doesn't adjust for width, or angle. Williams et al's clamping bolts pass through slots in the disc mounting brackets, and would be subject to slippage under rough field use conditions.

In summary, all of the above patents fail to provide a simple means for easy and exact adjustment of the individual cultivator discs in a cultivator assembly which remains firmly locked in the set position even during rugged field usuage. In low tillage cultivation, there is a special need for rapid and precise adjustment of the discs to meet particular field conditions.

SUMMARY OF THE INVENTION

This invention is directed to a cultivator having fixed, accurate disc positioning means in both the lateral and vertical planes as well as precise fixed angle adjustment relative to the direction of travel through the field. The precise adjustment is provided by positioning pins which cooperate with firm clamping means to hold each disc assembly in firm fixed position. The disc positioning means of the invention can be readily adjusted in the field by a single cultivator operator, and rough field conditions cannot cause the discs to be thrown out of alignment, once they have been adjusted.

The improved cultivator of this invention has greater versatility to meet all cropping conditions. In ridge tillage systems it permits high-speed ridging while making a desirable flat ridge. In minimum tillage operations, it operates smoothly in high trash conditions without plugging because the individual discs can be quickly and precisely adjusted in the field by a single operator to best meet the field conditions and there is the added assurance that once the adjustments are locked in, none of the individual discs can be knocked out of alignment.

In no-till operations, the cultivator aerates the soil and destroys escaped weeds giving a much cleaner field at harvest time, and a substantial improvement in crop yield. For conventional tillage operations, this improved cultivator works more acres at high speeds, and with more effective weed killing action in all field conditions. Much of the improved action can be attributed to the improved disc positioning means.

The improved disc positioning means of the invention provides exact positioning of the individual discs in vertical, lateral and angular relation to the direction of travel of the cultivator apparatus. This accurate positioning is accomplished by a combination of positioning pins and clamping bolts which cooperate to hold the disc in a locked position during field operations.

The simplified adjustment system for positioning the discs can be done in the field by a single operator. Other cultivators presently being sold require two people to make field adjustments, one to stand ahead of the cultivator and merely estimate the alignment of the discs with eye and the other to make the adjustments which are not positively locked in place but which can be knocked out of alignment by rough field conditions.

In contrast, one operator can make the necessary exact adjustments of the individual discs of the improved cultivator of the present invention in the field alone, and in less than half the time required for other commercially available cultivators. Because of the pilot hole-pin locking system, each adjustment is firmly and positively locked in position, and cannot be knocked out of alignment under rough field conditions. The cooperating combination of the positioning pin and clamping means provides a much improved cultivator disc adjustment system which greatly facilitates cultivating weed control under all field conditions.

The advantages of the improved adjustment means are multiplied with each cultivator assembly added to a cultivator rig, from one unit on up. In a six row cultivator, having the adjustment means of the invention, adjustment can be made in the field in about fifteen minutes, or less, whereas other commercial six row cultivators take about one half hour and two men, and even then, the individual adjustments are not exact, and may slip in rough field usuage.

DESCRIPTION OF THE PREFERRED EMBODIMENT

Figure 1:
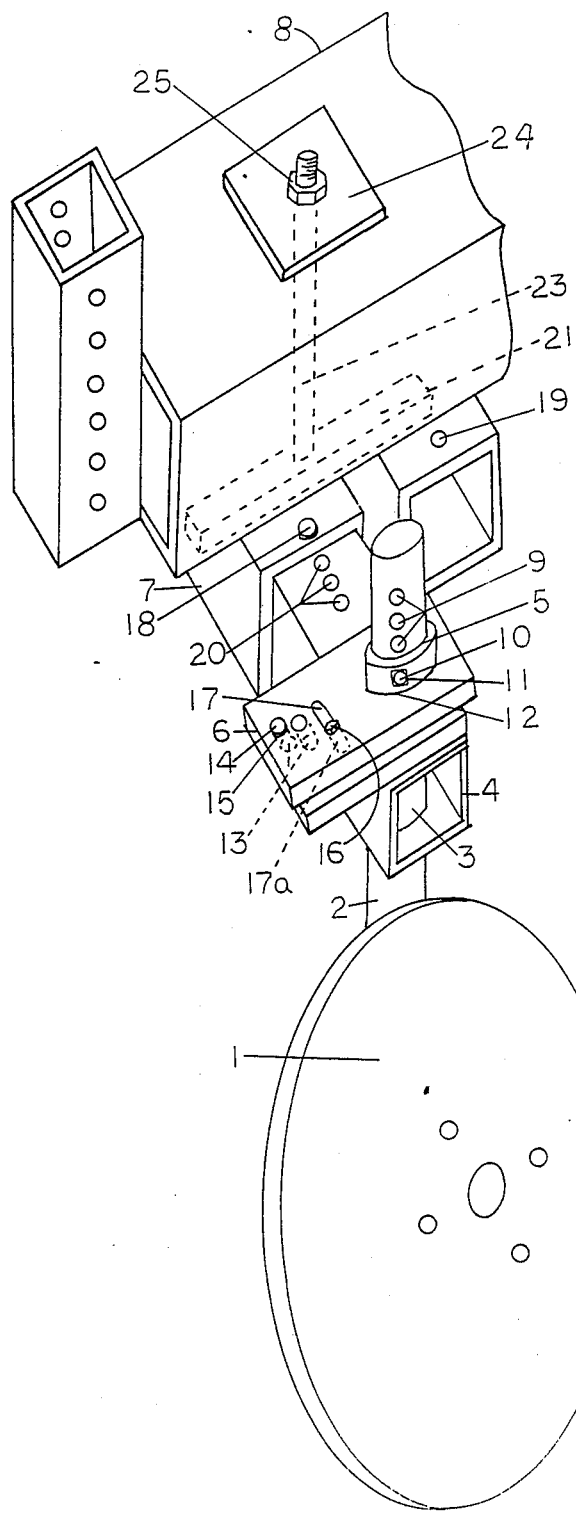
FIG. 1 is a perspective view showing one of a pair of cultivator disc assemblies with parts broken away and the lateral T-bar clamping means shown in phantom, and forming part of a cultivator or other land tilling implement.
Figure 2:
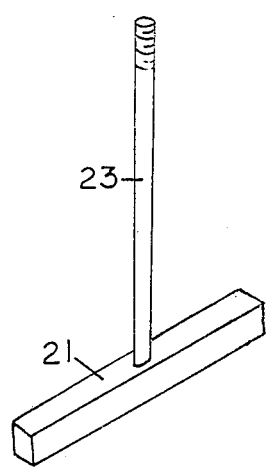
FIG. 2 is a perspective view of the T-bar clamp shown in phantom in FIG. 1.
Figure 3:
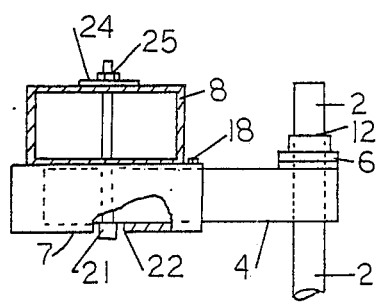
FIG. 3 is a front sectional view with parts broken away of the T-bar clamp of FIG. 2 in clamping position.

As shown in FIG. 1 of the drawings, the improved cultivator disc positioning means of the invention comprises an individual disc 1, which is rotatably mounted at the base of a vertical support shaft 2, which extends upwardly through an opening 3 in lateral adjustment bracket 4. The vertical support shaft 2 extends further upwardly through an opening 5 in an angle adjustment bracket 6, which is pivotally supported on the upper surface of the lateral adjustment bracket 4. The lateral adjustment bracket 4 supports the support shaft 2 on which the cultivator disc 1 is mounted. The lateral adjustment bracket 4 extends into, and is supported by, a lateral housing 7 in the main frame 8 of a cultivator disc assembly. The support-shaft 2 is provided with a plurality of vertically disposed, horizontal openings 9 and is supported by the angle adjustment bracket 6 by means of a height adjustment bolt 10 which extends horizontally through one of the openings 9 in the support shaft 2 and through opposed openings 11 in a collar 12 on the angle adjustment bracket 6. The lateral adjustment bracket 4 is disposed just below and supports the angle adjustment bracket 6, and is provided with a plurality of horizontally disposed, vertical openings 13 (shown in phantom) positioned at predetermined horizontal angles to receive an angle pilot pin 14 which extends vertically downwardly through an opening 15 in the angle adjustment bracket 6 through one of the aligned openings 13 in the lateral adjustment bracket 4 to thereby fix the angular position of the support shaft 2 and its respective disc 1.

Angle adjustment of each disc 1 is accomplished by first loosening angle locking bolt 16 on the angle adjustment bracket 6. Bolt 16 extends through a slot 17 in the angle adjustment bracket 6, into a threaded opening 17a in the lateral adjustment bracket 4, and when bolt 16 is loosened and angle pilot pin 14 is raised, the vertical support shaft 2 can be rotated to change the angle of disc 1 relative to direction of travel of the cultivator disc assembly. When the rotation of support shaft 2 has brought it to the desired angle with opening 15 in alignment with one of the openings 13 in the lateral adjustment bracket 4, the angle pilot pin 14 is reinserted through the opening 15 through the aligned opening 13. The angle locking bolt 16 is then retightened in slot 17 to provide a firmly locked angle adjustment which cannot be thrown out during cultivating.

Lateral adjustment is accomplished by sliding the lateral adjustment bracket 4 in the lateral housing 7 in the main frame 8. A fixed position is established by a lateral pilot pin 18 which extends downwardly through an opening 19 in the lateral housing 7 through one of a series of laterally spaced, vertical openings 20 in the lateral adjustment bracket 4. A T-bar 21 is disposed between two adjacent lateral housings 7, the crossbar of the inverted T-bar 21 nesting in grooves 22 cut transversely across the lateral housing 7. Stem 23 of the T-bar 21 extends upwardly between the lateral housing 7 through a clamp plate 24 resting on the top of the main frame 8, and is clamped in place by a clamping nut 25. Instead of four clamping nuts which would be required with the U-bolt clamping systems of the prior art, only one clamping nut 25 is required for lateral adjustment of each pair of cultivator discs of the subject invention.

Vertical adjustment of the support shaft 2 is accomplished by removing the bolt 10 from the opposed openings 11 and one of the openings 9 in the vertical support shaft 2. The support shaft 2 can then be raised or lowered as desired in the collar 12 until the correct opening 9 is aligned with opposed openings 11 in the collar 12. The bolt 10 is then reinserted and fastened in place to complete the height adjustment.

All of the adjustments described above are easy to make in the field, and provide definite, incremental adjustments for the cultivator disc 1 which cannot slip out of alignment under rough field operating conditions.

I claim:

1. In an implement for working the earth and cultivating a field which comprises one or more similar carrier units having individual earth-working means disposed thereon, an adjustment means for positioning the individual earth-working means, said adjustment means comprising:

vertical positioning means for supporting and vertically positioning the earth-working means in a definite, fixed position relative to its carrier unit, thereby controlling the depth of penetration into the field;

angular positioning means directly supported by said carrier unit for angularly positioning the earth-working means in a definite, fixed position relative to the direction of travel of the implement through the field; and lateral positioning means for laterally positioning the earth-working means in a definite, fixed position relative to its carrier unit, said angular and lateral positioning means each including at least two relatively movable parts, one of which includes a plurality of positioning openings therein to establish a fixed position for the part, the other having a complementary opening adapted to be aligned with one of said positioning openings, a rod-like member insertable through the aligned openings for fixing their positions in alignment, and separate clamping means for firmly holding the relatively movable parts of said angular and lateral positioning means in the selected aligned position.

2. The adjustment means of claim 1, in which two relatively movable parts of the angular positioning means comprises: a first horizontally disposed, plate-like bracket having a number of angular positioning openings therein; a second, horizontally disposed complementary plate-like bracket having an opening extending therethrough which can be aligned with any one of the opening sin the first plate-like bracket, one of said brackets being rigidly connected to the implement and the other being rigidly connected to the earth-working means, the rod-like member insertable through said aligned openings to firmly position the first and second plate-like brackets relative to each other and thereby firmly establish the angular position of said earth-working means relative to the direction of travel of said implement through the field.

3. The adjustment means of claim 1, in which the vertical positioning means comprises:
  a vertical support shaft for supporting said earth-working means, said support shaft having a plurality of vertically displaced, horizontally disposed openings therein;
  a collar member integral with one part of the angular positioning means and having complementary, horizontally disposed openings therein adapted to be aligned with one of said horizontally disposed openings in said support shaft; and
  a positioning bolt extending through said aligned openings for rigidly securing said vertical support shaft in a desired, predetermined position.

4. In an implement for working the earth and cultivating a field which comprises one or more similar carrier units having individual earth-working means disposed thereon, an adjustment means for positioning the individual earth-working means, said adjustment means comprising:
  vertical positioning means for supporting and vertically positioning the earth-working means in a definite, fixed position relative to its carrier unit, thereby controlling the depth of penetration into the field;
  angular positioning means comprising, a first horizontally disposed, plate-like bracket having a number of angular positioning openings therein; a second, horizontally disposed complementary plate-like bracket having an opening extending therethrough which can be aligned with any one of the openings in the first plate-like bracket, one of said brackets being rigidly connected to the implement and the other being rigidly connected to the earth-working means, a locking pin means insertable through said aligned openings to firmly position the first and second plate-like brackets relative to each other and thereby firmly establish the angular position of said earth-working means relative to the direction of travel of said implement through the field;
  lateral positioning means for laterally positioning the earth-working means in a definite, fixed position relative to its carrier unit, said angular and lateral positioning means each including at least two relatively movable parts, one of which includes a plurality of positioning openings therein to establish a fixed position for the part, the other having a complementary opening adapted to be aligned with one of said positioning openings, a rod-like positioning member insertable through the aligned openings for fixing their positions in alignment, and separate clamping means for firmly holding the relatively movable parts of said angular and lateral positioning means in the selected aligned position; and
  wherein said clamping means for the angular positioning means comprises a first, slot-like opening in one of the plate-like brackets; a complementary opening in the other plate-like bracket; and a rod-like fastening member extending through both the slot-like opening and the complementary opening, said fastening member being adapted to firmly hold the plate-like brackets in a selected, aligned position.

5. The adjustment means of claim 4, in which the rod-like fastening member comprises a fastening bolt and nut assembly having the nut assembly disposed on the upper surface of the top plate-like bracket.

6. In an implement for working the earth and cultivating a field which comprises one or more similar carrier units having individual earth-working means disposed thereon, an adjustment means for positioning the individual earth-working means, said adjustment means comprising:
  vertical positioning means for supporting and vertically positioning the earth-working means in a definite, fixed position relative to its carrier unit, thereby controlling the depth of penetration into the field;
  angular positioning means directly supported by said carrier unit for angularly positioning the earth-working means in a definite, fixed position relative to the direction of travel of the implement through the field;
  said angular positioning means including at least two relatively movable parts, one of which includes a plurality of positioning openings therein to establish a fixed position for the part, the other having a complementary opening adapted to be aligned with one of said positioning openings, a first rod-like positioning member insertable through the aligned openings for fixing their positions in alignment, separate clamping means for firmly holding the relatively movable parts of said angular positioning means in the selected aligned position;
  lateral positioning means comprising
  a first support member which supports the earth-working means;
  a second support member rigidly connected to the carrier unit, said first support member being slidably disposed in, and supported by, said second support member;
  a plurality of laterally displaced, vertical openings in one of said support members;
  a complementary vertical opening in the other of said support members adapted to be aligned with any one of the laterally displaced vertical openings; and
  a second rod-like positioning member extending through one of said laterally displaced, vertical openings and said complementary vertical opening to fixedly position said support members relative to each other and thereby establish the lateral position of said earth-working means relative to the direction of travel in the field.

7. The adjustment means of claim 6, including clamping means for firmly holding the support members in a laterally aligned position.

8. The adjustment means of claim 7, in which the clamping means comprises an inverted T-bar bolt having a cross-bar and a stem section at right angles thereto, said stem section extending upwardly between two adjacent second support members, said second support members each having a transverse groove in the bottom surface thereof, the respective halves of the cross-bar of said inverted T-bar being nested in the respective adjacent transverse grooves of two adjacent second support members in clamping contact with said first support members;
  an upper horizontal clamping plate bridging two adjacent second support members and resting on the top surfaces thereof, said clamping plate having an opening therein to receive the upper end of the stem section of said T-bar bolt; and fastening means for firmly fastening said T-bar bolt stem section to said clamping plate to thereby firmly clamp the two adjacent support members in place.

9. In a low tillage cultivator having a main frame and a plurality of cultivator discs supported thereon for cultivating growing row crops to eliminate weeds, a three-dimensional adjustment means for positioning the individual cultivator discs in a plurality of fixed positions relative to the row crops for most effective cultivation, said adjustment means comprising:

a lateral housing supported by the main frame;

a lateral adjustment bracket supported by said lateral housing and laterally slidable in said housing;

a plurality of laterally displaced openings in the top surface of said lateral adjustment bracket;

a complementary opening disposed in the top surface of said lateral housing;

a pilot pin adapted to be inserted through said complementary opening and through one of said laterally displaced openings in said lateral adjustment bracket to establish the lateral position of the associated cultivator disc;

a first angular adjustment bracket disposed on said lateral adjustment bracket and supported thereby;

a plurality of angularly displaced, vertical openings in the top surface of said first angular adjustment bracket;

a second angular adjustment bracket having a complimentary opening extending therethrough adapted to be aligned with one of said angularly displaced, vertical openings;

a locking pin for insertion through one of said angularly displaced vertical openings and said complementary opening to position said cultivator disc at any one of a plurality of angular positions;

vertical adjustment means defined by part of said angular adjustment means, comprising;

an integral collar formed in the top surface of said angular adjustment means, said collar having aligned, horizontally disposed openings therein;

a vertically disposed support shaft extending upwardly through said integral collar for suspending an individual cultivator disc thereon;

a plurality of horizontally displaced openings disposed in said support shaft; and a positioning bolt extending through said openings in said integral collar and through an aligned one of said openings in said support shaft for vertically positioning and supporting said support shaft and its individual cultivator disc in a predetermined vertical position relative to the row crops being cultivated.

10. The adjustment means of claim 9, in which the lateral adjustment bracket is firmly clamped in place by a clamping means.

11. The adjustment means of claim 9, in which a pair of cultivator discs are disposed adjacent each other, and each is supported by individual, three-dimensional adjustment means, each adjustment means including lateral housings supported by the main frame and disposed substantially parallel to each other, each lateral housing having a groove disposed transversely in the underside thereof;

a T-bar clamping member having a central bolt portion and a cross-bar portion, said cross-bar portion adapted to fit in two adjacent grooves in adjacent lateral housings in clamping contact with the respective lateral adjustment bracket, the central bolt portion of said T-bar clamping member extending upwardly between the adjacent lateral housings;

a horizontally disposed clamping plate member bridging the adjacent lateral housings on the upper surfaces thereof, said clamping plate member having an opening therein through which said central bolt portion extends; and fastening means on said central bolt portion for firmly clamping the lateral adjustment brackets in rigid lateral position.

* * * * *